I. MOSS.
ANTIFRICTION BEARING.
APPLICATION FILED APR. 24, 1909.
939,060. Patented Nov. 2, 1909.
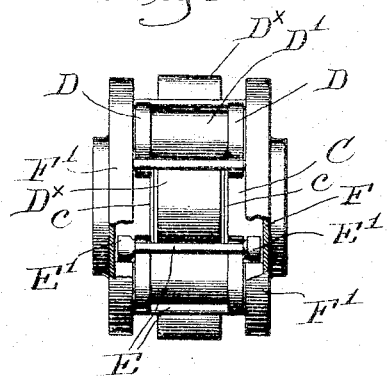
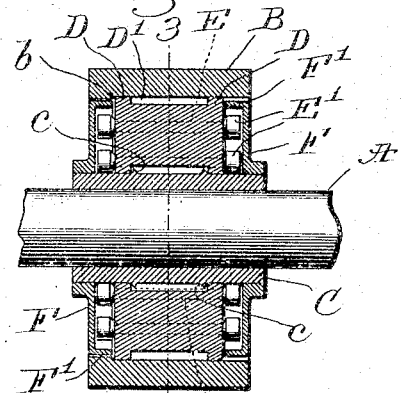
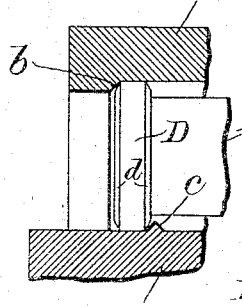
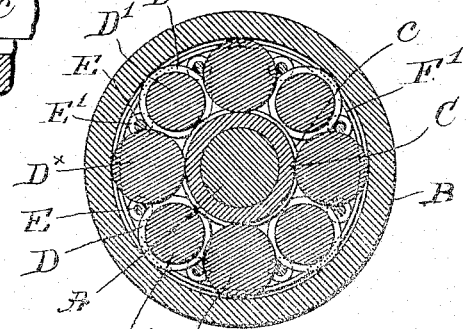
Witnesses.
Thomas J. Drummond
Joseph M. Ward
Inventor.
Isidor Moss.
by Crosby Gregory
attys.

UNITED STATES PATENT OFFICE.

ISIDOR MOSS, OF BOSTON, MASSACHUSETTS.

ANTIFRICTION-BEARING.

939,060.

Specification of Letters Patent.  Patented Nov. 2, 1909.

Application filed April 24, 1909. Serial No. 491,919.

*To all whom it may concern:*

Be it known that I, ISIDOR MOSS, a citizen of the United States, and resident of Boston, county of Suffolk, State of Massachusetts, have invented an Improvement in Antifriction - Bearings, of which the following description, in connection with the accompanying drawing, is a specification, like letters on the drawing representing like parts.

This invention relates to anti-friction bearings, more particularly of the type shown in United States Patent No. 645,299 granted to me March 13, 1900, and it has for its object the production of a bearing of such type wherein, by means of novel features of construction, the separators are positively retained in proper position, and the contact points between the inner and outer members of the bearing and the interposed load-transmitting rolling members are increased in number and brought closer together. By such arrangement the separators cannot become displaced when parts of the bearing are slightly worn; the strain due to the load is more uniformly equalized over the whole bearing; the chance of derangement of any of the parts, owing to wear, is reduced to a minimum; and the operation of the bearing as a whole improved and simplified, the construction and arrangement being such that a very strong and durable bearing is secured, with very little friction and of the rolling type throughout. These and other novel features of my invention will be fully described in the subjoined specification and particularly pointed out in the following claims.

Figure 1 is a side elevation, partly broken out, of the load-transmitting rolls, the separators, and the means for preventing outward movement of the separators, embodying one form of my invention, the casing or outer member of the bearing and the shaft being omitted; Fig. 2 is a diametrical section of an anti-friction bearing embodying my invention, the shaft being shown in elevation; Fig. 3 is a transverse section thereof on the line 3—3, Fig. 2; Fig. 4 is an enlarged detail in section and part elevation, to be referred to.

The anti-friction bearing includes, in general, a shaft A, a concentric outer member or casing B, and a series of load-transmitting rolling members interposed between them, said rolling members bearing directly and tangentially against the inner annular surface of the casing, and as herein shown said members bear tangentially against an inner member C, which may be a sleeve surrounding and fixedly attached to the shaft, or it may be a part of the shaft itself, as may be most convenient. I deem it preferable in most instances to make such inner member as a sleeve which can be applied to the shaft, in order that the transmitting members, herein shown as rolls, and their separators may be removed bodily, as will be explained, and as shown in Fig. 1. Whichever construction be adopted the part C is provided with two parallel annular projections $c$, $c$, made with oppositely beveled faces, see Figs. 2 and 4.

A series of load-transmitting rolls D, $D^x$ is interposed between the part C and the outer member or casing B, each alternate roll $D^x$ being a true cylinder and traveling upon the part C between the projections $c$, Fig. 3, while the intervening rolls D are reduced in diameter at $D'$ to clear the adjacent rolls $D^x$, see Figs. 1 and 3, so that the bearing portions of adjacent rolls overlap each other, the bearing surfaces of such adjacent rolls lying in intersecting cylinders. Thus the end portions of rolls D are the bearing portions of said rolls, and they are of the same diameter as the rolls $D^x$, but they bear against the part or sleeve C outside the projections $c$, which latter thereby serve to prevent longitudinal movement of all the load-transmitting rolls. By making the projections $c$ with beveled faces practically a line contact is effected between them and the ends of the rolls, thereby diminishing friction due to such contact. As all the rolls D, $D^x$ have their bearing surfaces of the same diameter the load strains are equally sustained and distributed, and owing to the construction described adjacent rolls so closely approach or overlap each other that the contacts with the inner and outer members of the bearing are brought near together, so that a more uniform distribution and transmission of the load is effected than would be possible were the rolls far apart. I prefer to slightly bevel the corners of the bearing surfaces of the rolls D, as at $d$, Fig. 4, and at a different angle from the bevel of the projections $c$, to obviate any surface friction and to restrict the contact to practically a line. The load-transmitting rolls are spaced apart or separated by separators shown as small rolls E, one of the separators being placed between each pair of load-transmitting rolls, and in rolling contact with a roll D× throughout its length and with the rolls D only at their ends or bearing surfaces.

As best shown in Fig. 3 the axes of the separators are exterior to a circle intersecting the axes of the rolls D and D×, so that the said rolls hold the separators from inward radial movement, as will be apparent, while at the same time the separators space or maintain the load-transmitting rolls always at the proper distance apart. The ends of the separators E are enlarged at E′ and beveled adjacent the outer ends of the rolls D, D×, Figs. 1 and 2, and in order to hold the separators against radial outward movement I provide disks F which have their hubs secured to the part C of the bearing, said disks being provided with inturned peripheral flanges F′ which surround the enlarged ends or heads E′ of the separators, as shown. Obviously the separators cannot move outward as the overlying flanges F′ will prevent such movement, hence the separators are always retained in proper working position with relation to the load-transmitting rolls. The disks F substantially fill the space between the casing B and the part C of the bearing, preventing the entrance of dust and dirt and protecting the internal portions of the bearing, this arrangement being well illustrated in Fig. 2.

Inasmuch as the flanged disks F are attached to the sleeve-like part C it will be seen that the rolls D, D× and the separators are held in a species of cage, and hence the part C may be removed from the casing carrying the rolls and separators bodily, and said parts will be retained in their proper relative position, as illustrated in Fig. 1. If the part C is permanently attached to or forms a part of the shaft the cage-like action is still present, for the shaft and casing may be separated, and the load-transmitting rolls and separators will go with the shaft and will be retained in working relation. This caging is very convenient in assembling the bearing, or when taking it apart for cleaning or repair.

I have shown the casing B as provided at one end with an internal, annular and beveled shoulder b, best shown in the enlarged detail, Fig. 4, the bevel being at a different angle from the bevel d of the rolls D, so that end thrust of said rolls is taken up by the shoulder and owing to the different bevels of b and d a line contact is effected, with a minimum of friction.

When relative rotation of the shaft and casing is effected the rolls D, D× will all be rotated about their axes in one direction and at the same speed, and as the separators E are in engagement with the bearing surfaces of the said rolls, having like diameters but traveling in opposite directions, said separators will be revolved freely on their own axes, and with a minimum of friction.

Inasmuch as the part on which is located the bearing surface of one rolling member overlaps the part on which is located the bearing surface of the adjacent member it is impossible for the interposed separator to become displaced, for the overlapping portions of the adjacent rolling members will act as a positive support for the separator, even if considerable wear should occur.

The construction of the bearing is simple, it is strong, durable and highly efficient, and is readily assembled or taken apart, and while I have illustrated the best form thereof now known to me various changes or modifications in details of construction and arrangement may be made by those skilled in the art without departing from the spirit and scope of my invention as set forth in the annexed claims.

Having fully described my invention, what I claim as new and desire to secure by Letters Patent is:—

1. An anti-friction bearing comprising concentric and relatively rotatable members, a series of load-transmitting rolling members interposed between and bearing against said first-named members, the bearing surfaces of adjacent rolling members traveling on the concentric members in separate parallel paths, said bearing surfaces of all of the rolling members being of the same diameter, separators between and having their axes exterior to a circle intersecting the axes of the rolling members, each separator coöperating with the adjacent rolling members and being held by them from inward movement, and independent means to hold the separators from outward movement.

2. An anti-friction bearing comprising concentric inner and outer members, a series of load-transmitting rolling members interposed between and bearing against said first-named members, the bearing surfaces of adjacent rolling members lying in intersecting cylinders, rotatable separators between said rolling members and held by their bearing surfaces from movement in one direction, and independent means to coöperate with the separators and hold them from movement in the opposite direction.

3. An anti-friction bearing comprising inner and outer members, a series of load-transmitting rolls closely approaching each other and bearing against the said members, the bearing surfaces of adjacent rolls traveling on said members in separate parallel paths, cylindrical separators between and contacting with the bearing surfaces of the rolls and located exterior to a circle intersecting the axes of said rolls, the latter holding the separators from movement toward the inner member, and independent means carried by the inner member to hold the separators from outward movement.

4. An anti-friction bearing comprising a shaft, a casing, a series of load-transmitting rolls bearing against the shaft and casing, alternate rolls being reduced in diameter between their bearing ends to clear the bearing surfaces of the intervening rolls, separators between and in tangential engagement with the bearing surfaces of adjacent rolls, the latter holding the separators from radial movement in one direction, and independent means to hold the roll-separators from radial movement in the opposite direction.

5. An anti-friction bearing comprising a shaft, a casing, a series of load-transmitting rolls interposed between and bearing against the shaft and casing, alternate rolls tangentially engaging said parts from end to end and the intervening rolls having such engagement with said parts beyond the ends of the first-named rolls, whereby the rolls overlap each other, means on the shaft to prevent axial movement of the rolls relatively thereto, separators interposed between and in engagement with the bearing surfaces of adjacent rolls and held by the latter from inward movement, and independent means carried by the shaft to coöperate with the ends of and hold the roll-separators from outward movement.

6. An anti-friction bearing comprising an inner member, a concentric casing having at one end an internal, annular and beveled shoulder, a series of load-transmitting rolls interposed between and bearing against the inner member and the casing, alternate rolls having their ends adjacent the shoulder beveled at a different angle to minimize contact therewith, the bearing surfaces of adjacent rolls traveling in separate parallel paths on said inner member and casing, separators between the rolls and having enlarged ends beyond the ends of the rolls, to prevent longitudinal displacement of the separators, means on the inner member to prevent longitudinal movement of said rolls, the separators being exterior to a circle intersecting the axes of the rolls and contacting with their bearing surfaces, whereby the latter hold the separators from inward movement, and cup-like retainers on the inner members to inclose the enlarged ends of and hold the separators from outward movement, the flange on the casing taking up end thrust in one direction.

7. An anti-friction bearing comprising a shaft, a sleeve thereon having parallel annular projections, a casing, a series of load-transmitting rolls interposed between and bearing against the sleeve and casing, alternate rolls traveling between the projections and the intervening rolls having their bearing surfaces outside the projections, separators between the rolls and held thereby from inward movement, and annular boxes fast on the sleeve and coöperating with the separators to hold them from outward movement, said boxes substantially closing the space between the shaft and casing at the ends of the bearing.

In testimony whereof, I have signed my name to this specification, in the presence of two subscribing witnesses.

ISIDOR MOSS.

Witnesses:
JOHN C. EDWARDS,
THOMAS J. DRUMMOND.